(12) United States Patent
Mobley

(10) Patent No.: US 10,899,209 B2
(45) Date of Patent: Jan. 26, 2021

(54) VEHICLE CAB PROTECTIVE TOP COVER SYSTEM

(71) Applicant: Robert L. Mobley, Round Rock, TX (US)

(72) Inventor: Robert L. Mobley, Round Rock, TX (US)

( * ) Notice: Subject to any disclaimer, the term of this patent is extended or adjusted under 35 U.S.C. 154(b) by 53 days.

(21) Appl. No.: 16/355,644

(22) Filed: Mar. 15, 2019

(65) Prior Publication Data

US 2019/0283559 A1 Sep. 19, 2019

Related U.S. Application Data

(60) Provisional application No. 62/643,628, filed on Mar. 15, 2018.

(51) Int. Cl.
*B60J 11/06* (2006.01)
*B60J 11/04* (2006.01)

(52) U.S. Cl.
CPC .............. *B60J 11/04* (2013.01); *B60J 11/06* (2013.01)

(58) Field of Classification Search
CPC .................................. B60J 11/04; B60J 11/06
See application file for complete search history.

(56) References Cited

U.S. PATENT DOCUMENTS

| | | | | |
|---|---|---|---|---|
| 2,844,291 A | * | 7/1958 | McPheeters | B60R 9/08 224/317 |
| 3,145,046 A | * | 8/1964 | Orn | B60P 3/34 296/26.02 |
| 3,309,132 A | * | 3/1967 | Name Not Available | B60P 3/32 296/164 |
| 3,665,355 A | * | 5/1972 | Sasaki | H01F 7/0215 335/306 |
| 4,508,381 A | | 4/1985 | Herring | |
| 4,708,388 A | | 11/1987 | Zacharczuk | |
| 4,890,879 A | * | 1/1990 | Hurlock | B62D 35/002 296/156 |
| 4,903,749 A | * | 2/1990 | Hanania | B60J 11/08 160/370.21 |
| 4,957,400 A | * | 9/1990 | Karp | B60R 9/00 224/309 |
| 5,009,465 A | * | 4/1991 | Induni | B60J 7/08 160/327 |
| 5,244,245 A | * | 9/1993 | Kashino | B60J 11/00 296/136.11 |
| 5,655,810 A | | 8/1997 | Shikler | |
| 5,788,319 A | * | 8/1998 | Pruitt | B60P 3/341 296/164 |

(Continued)

FOREIGN PATENT DOCUMENTS

WO    WO-2011146966 A1 * 12/2011 ............. B60J 11/04

*Primary Examiner* — Lori L Lyjak
(74) *Attorney, Agent, or Firm* — Charles Runyan; Runyan Law

(57) ABSTRACT

A vehicle cab protective top cover system including a platform assembly having a top-surface, a bottom-surface, and a magnet fastener system. The platform assembly is defined by the top-surface and the bottom-surface forming a thickness. The magnet fastener system is embedded within the platform assembly and may removably fasten the platform assembly to a metal surface of a top portion of a cab of a vehicle. The platform assembly forms a barrier and provides a protective top cover for the top portion of the cab of the vehicle.

17 Claims, 5 Drawing Sheets

(56) References Cited

U.S. PATENT DOCUMENTS

| | | | | |
|---|---|---|---|---|
| 6,315,327 | B1* | 11/2001 | Woolsey | B60R 11/00 |
| | | | | 280/770 |
| 7,654,423 | B1* | 2/2010 | Christiansen | B60R 9/058 |
| | | | | 224/321 |
| 9,004,088 | B1* | 4/2015 | Nicheporuck | B60J 11/04 |
| | | | | 135/115 |
| 2004/0123892 | A1* | 7/2004 | Kim | E04H 6/025 |
| | | | | 135/88.08 |
| 2005/0218692 | A1* | 10/2005 | McNamee | B60J 11/00 |
| | | | | 296/136.07 |
| 2005/0242610 | A1* | 11/2005 | Galindo | B60J 11/08 |
| | | | | 296/95.1 |
| 2007/0114812 | A1* | 5/2007 | Hunt | B60R 13/08 |
| | | | | 296/181.6 |
| 2010/0007169 | A1* | 1/2010 | Nguyen | B60J 11/06 |
| | | | | 296/136.07 |
| 2011/0095561 | A1* | 4/2011 | Li | B60J 11/04 |
| | | | | 296/136.13 |
| 2012/0285588 | A1* | 11/2012 | Sheppard | B60J 11/04 |
| | | | | 150/166 |
| 2016/0009166 | A1* | 1/2016 | Sassi | B60J 11/02 |
| | | | | 296/98 |
| 2016/0101678 | A1* | 4/2016 | Fogarty | B60J 11/04 |
| | | | | 160/127 |
| 2016/0207385 | A1* | 7/2016 | Ward | B60J 11/04 |
| 2018/0334020 | A1* | 11/2018 | Garnick | B60J 11/04 |

* cited by examiner

VEHICLE CAB PROTECTIVE TOP COVER SYSTEM

CROSS REFERENCE TO RELATED APPLICATION

The present application is related to and claims priority to U.S. Provisional Patent Application No. 62/643,628 filed 2018 Mar. 15, which is incorporated by reference herein in its entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

1. Field of the Invention

The present invention relates generally to the field of vehicles and more specifically relates to covers.

2. Description of Related Art

Many individuals use truck for working projects. Anyone who has ever hauled long building materials or a ladder in their pickup truck knows that these items are prone to rubbing, scratching, and causing other damage to the roof of the cab. Some pickup owners may use old towels, t-shirts, cardboard, and more to act as a buffer, but this is not very effective. Other pickup owners may install permanent headache racks, but this is not convenient or practical. A suitable solution is desired.

U.S. Pat. No. 7,000,970 to Frank Herrera, Jr. relates to a molded dashboard cover. The described molded dashboard cover includes a molded dashboard cover formed from plastic, fiberglass, polypropylene or related synthetic materials to give the dashboard of a vehicle a smooth appearance or an ornate appearance. The molded dashboard cover is retained in place on the vehicle dashboard by a front lip which is press fit between the front upper surface of the dashboard and the interior surface of the windshield and an interior rear lip which is press fit between the rear of the dashboard and the facie cover of the instrument panel. Openings in the molded dashboard cover accommodate the instrument panel, the glove box and the heating and air conditioning vents.

BRIEF SUMMARY OF THE INVENTION

In view of the foregoing disadvantages inherent in the known vehicles art, the present disclosure provides a novel vehicle cab protective top cover system. The general purpose of the present disclosure, which will be described subsequently in greater detail, is to provide a protective barrier for a vehicle cab when hauling oversized loads and other items resting on a top portion of a vehicle cab to protect the cab from impact and scraping damage.

A vehicle cab protective top cover system is disclosed herein. The vehicle cab protective top cover system includes a semi-rigid foam platform assembly having a top-surface, a bottom-surface, and a magnet fastener system. The platform assembly is defined by the top-surface and the bottom-surface forming a thickness. The magnet fastener system preferably includes a plurality of magnets embedded within the platform assembly and configured to removably fasten the platform assembly to a metal surface of a top portion of a cab of a vehicle. The magnet fastener system is proximal to the bottom-surface such that the bottom-surface is able to magnetically engage with the top portion of the cab of the vehicle. The platform assembly forms a barrier and provides a protective top cover for the top portion of the cab of the vehicle. A method for using the device can be inferred from the information contained herein.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a vehicle cab protective top cover system, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to vehicles and more particularly to a vehicle cab protective top cover system as used to improve the covering and protection of a top-portion of a vehicle cab on job projects.

Generally, the present invention provides a safe, convenient way to haul building materials, a ladder, rebar, and other long items in the back of a pickup truck. It prevents damage and paint scratches to the truck's cab, as well as expensive repairs. Further, it preferably includes embedded magnets for quick and easy attachment to the roof of a truck cab. It eliminates the need to install large, permanent headache racks or use towels, old t-shirts, cardboard, doormats, and other makeshift buffers. The present invention saves pickup truck owners a considerable amount of time and frustration.

The device protects the top of pickup truck cabs from hauling long materials. this innovative product features a thick, sturdy platform, made from expanded polystyrene foam, measuring approximately 2" to 2.5" thick. extending across the top edge of the platform can be a hard surface, made from wood or other suitable material, measuring about 3" wide and 0.5" thick, to protect the foam and evenly distribute weight across the top of the cab. additionally, interior magnets allow for attachment to the roof of a pickup truck cab. when not in use, the magnet fastener system can 'retreat' back inside of the platform. further, a removable weatherproof outer covering can protect the platform. The covering can be offered in variety of colors, including camouflage.

Figure 1:
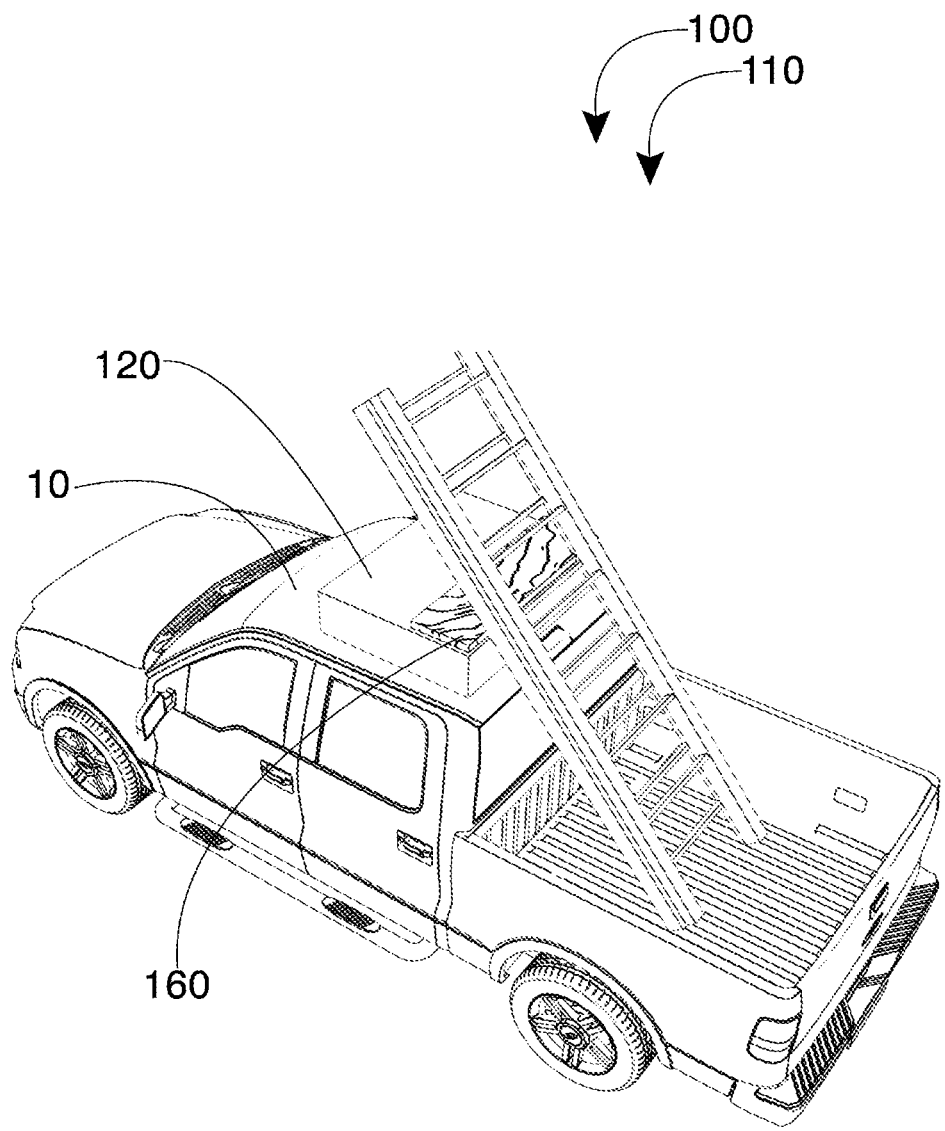
FIG. 1 is a perspective view of the vehicle cab protective top cover system during an 'in-use' condition, according to an embodiment of the disclosure.

Referring now more specifically to the drawings by numerals of reference, there is shown in FIGS. 1-5, various views of a vehicle cab protective top cover system 100. FIG. 1 shows a vehicle cab protective top cover system 100, according to an embodiment of the present disclosure. As illustrated, the vehicle cab protective top cover system 100 may include a platform assembly 110 having a top-surface 120, a bottom-surface 130, and a magnet fastener system 140. The platform assembly 110 is defined by the top-surface 120 and the bottom-surface 130 forming a thickness. The magnet fastener system 140 is embedded within the platform assembly 110 and configured to removably fasten the platform assembly 110 to a metal surface of a top portion of a cab 10 of a vehicle. The platform assembly 110 forms a barrier and provides a protective top cover for the top portion of the cab 10 of the vehicle.

Figure 2:
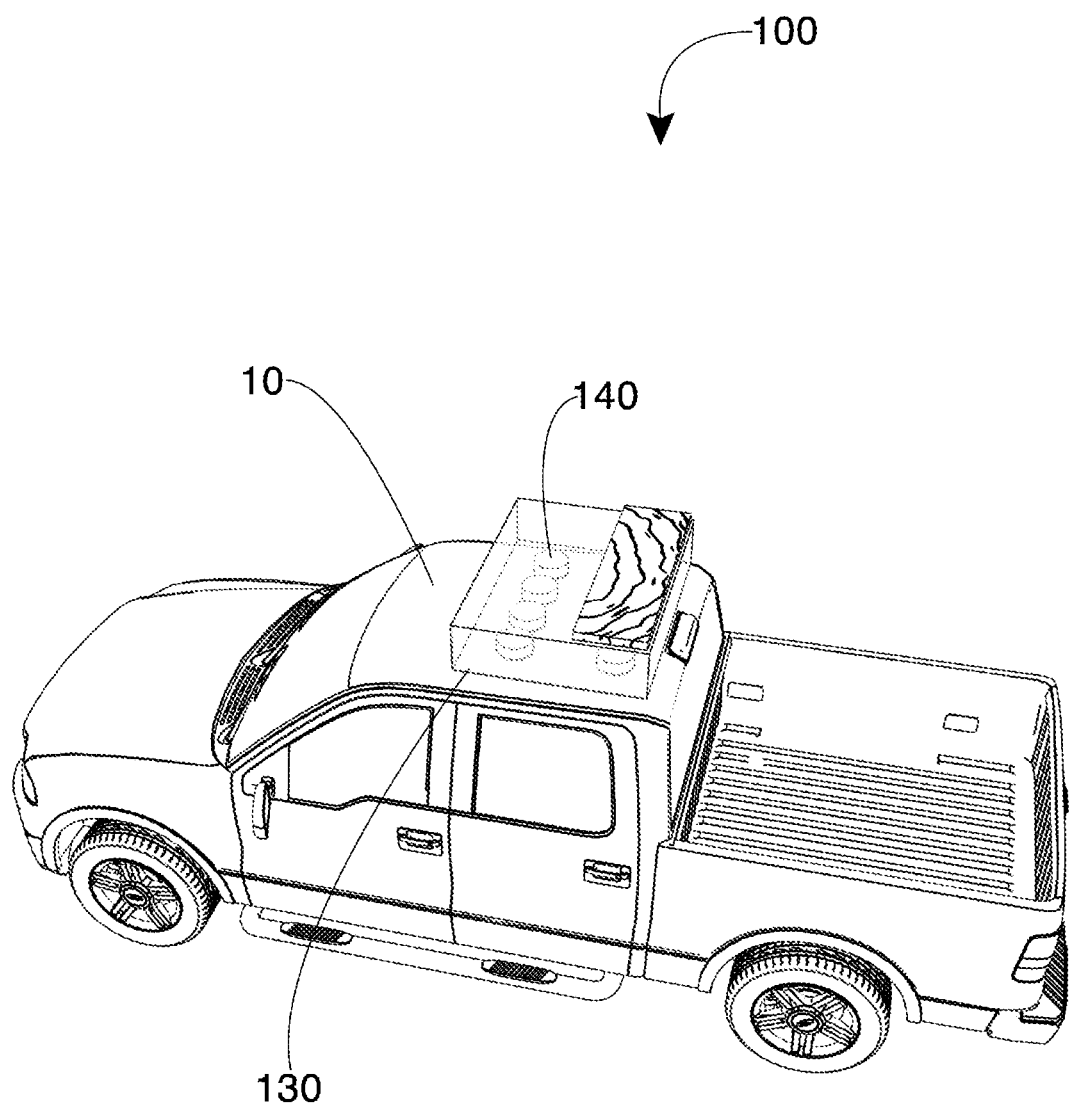
FIG. 2 is a perspective view of the vehicle cab protective top cover system of FIG. 1, according to an embodiment of the present disclosure.

FIG. 2 shows a perspective view of the vehicle cab protective top cover system 100 of FIG. 1, according to an embodiment of the present disclosure. As above, the vehicle cab protective top cover system 100 may include the platform assembly 110 defined by the top-surface 120 and the bottom-surface 130 and including the integral magnet fastener system 140. The platform assembly 110 comprises semi-rigid foam providing a protective cushion-like barrier between the vehicle and items being loaded and hauled in the vehicle. In a preferred embodiment, the semi-rigid foam comprises expanded polystyrene foam. The platform assembly 110 comprises a three-dimensional substantially rectangular profile. The platform assembly 110 covers a substantial portion of the top portion of the cab 10.

Figure 3:
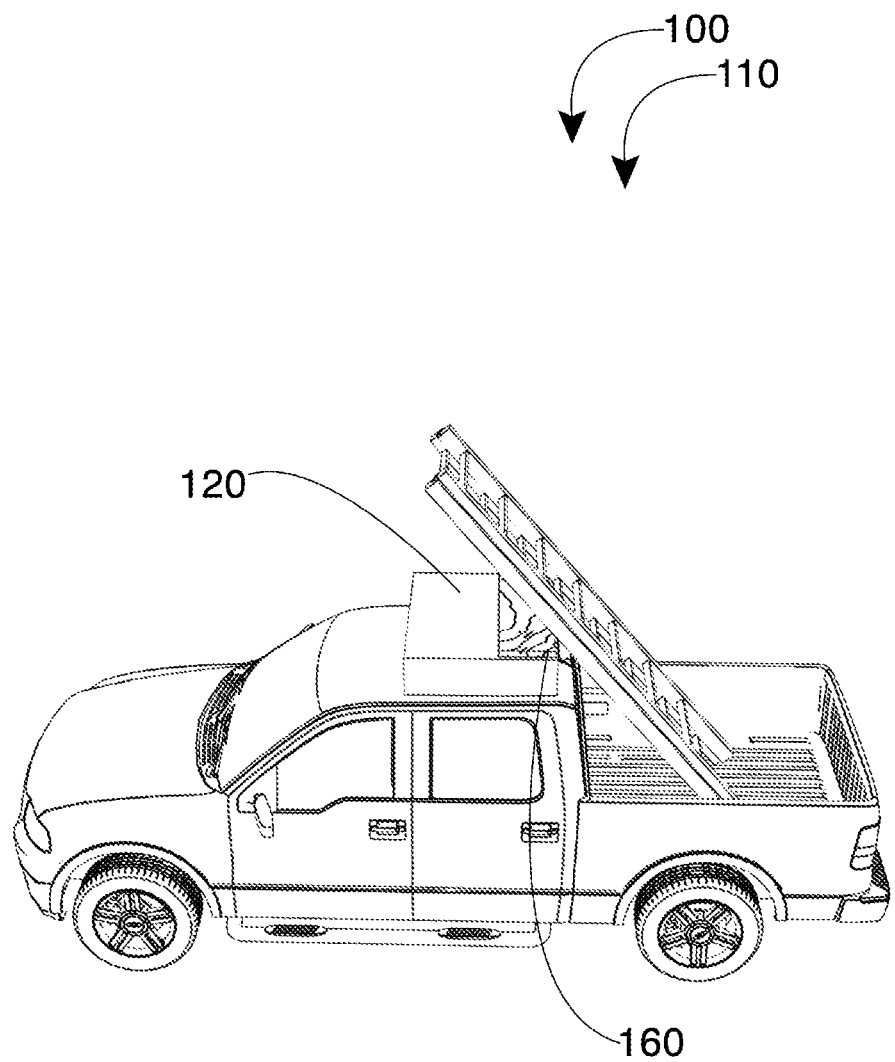
FIG. 3 is a perspective view of the vehicle cab protective top cover system of FIG. 1, according to an embodiment of the present disclosure.

FIG. 3 shows a perspective view of the vehicle cab protective top cover system 100 of FIG. 1, according to an embodiment of the present disclosure. As above, the vehicle cab protective top cover system 100 may include the platform assembly 110 defined by the top-surface 120 and the bottom-surface 130 and including the integral magnet fastener system 140 for securing the device to a cab 10 of a vehicle. The platform assembly 110 is removably affixable to the cab 10 of the vehicle and the magnet fastener system 140 provides a temporary fastener for use. The magnet fastener system 140 is proximal to the bottom-surface 130 such that the bottom-surface 130 is able to magnetically engage with the top portion of the cab 10 of the vehicle. The magnet fastener system 140 comprises a plurality of magnets. The vehicle may be stationary or non-stationary during use of the platform assembly 110.

Figure 4:
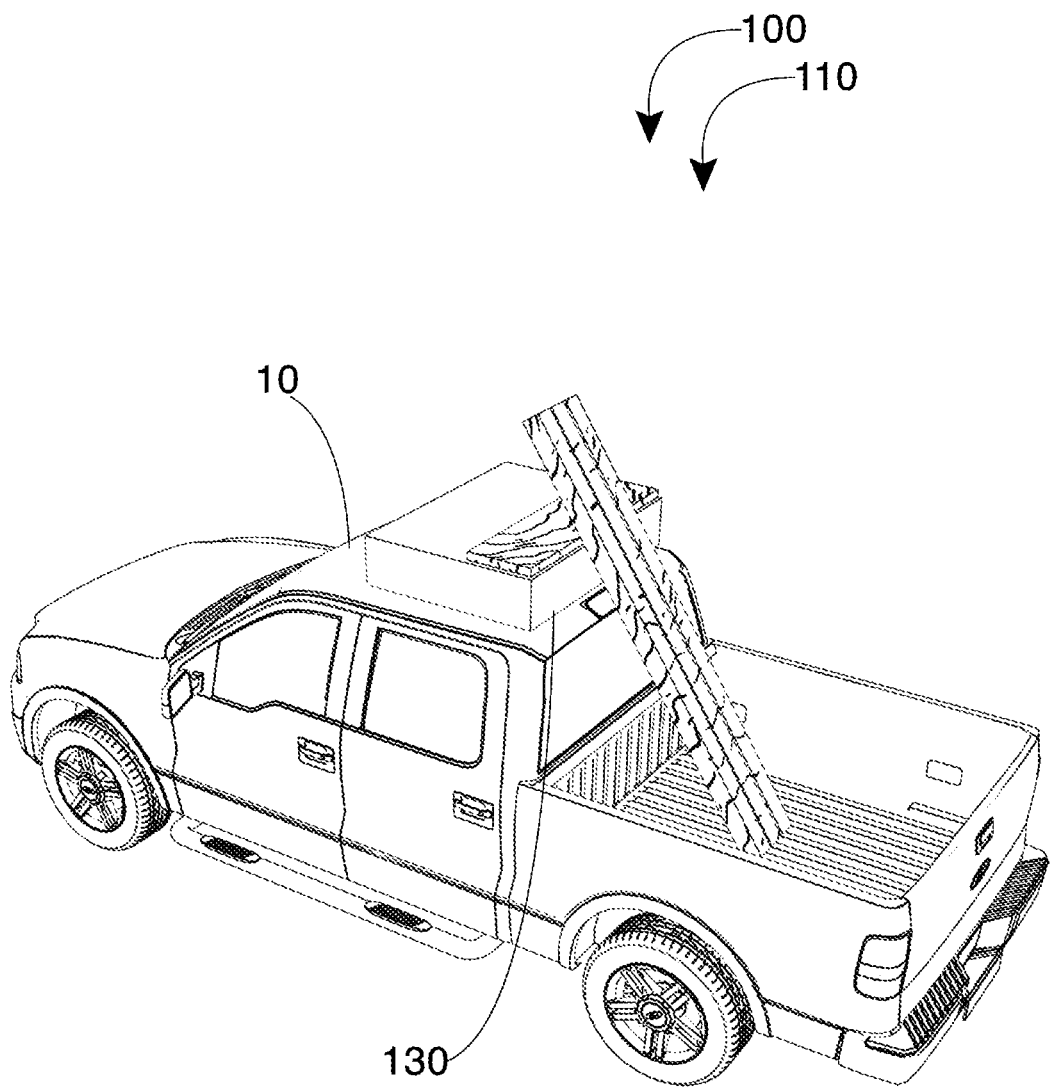
FIG. 4 is a perspective view of the vehicle cab protective top cover system of FIG. 1, according to an embodiment of the present disclosure.

FIG. 4 shows a perspective view of the vehicle cab protective top cover system 100 of FIG. 1, according to an embodiment of the present disclosure. As above, the vehicle cab protective top cover system 100 may include the platform assembly 110 having the top-surface 120, bottom-surface 130, and magnet fastener system 140 in functional combination. In certain embodiments, the platform assembly 110 further comprises a rigid section 160. The rigid section 160 extends along a top edge of the top-surface 120. The ridged section 160 may comprise wood or other suitable materials. The ridged section 160 is approximately 3 inches wide and 0.5 inch thick. The thickness of the platform assembly 110 is between 2 inches and 2.5 inches.

Figure 5:
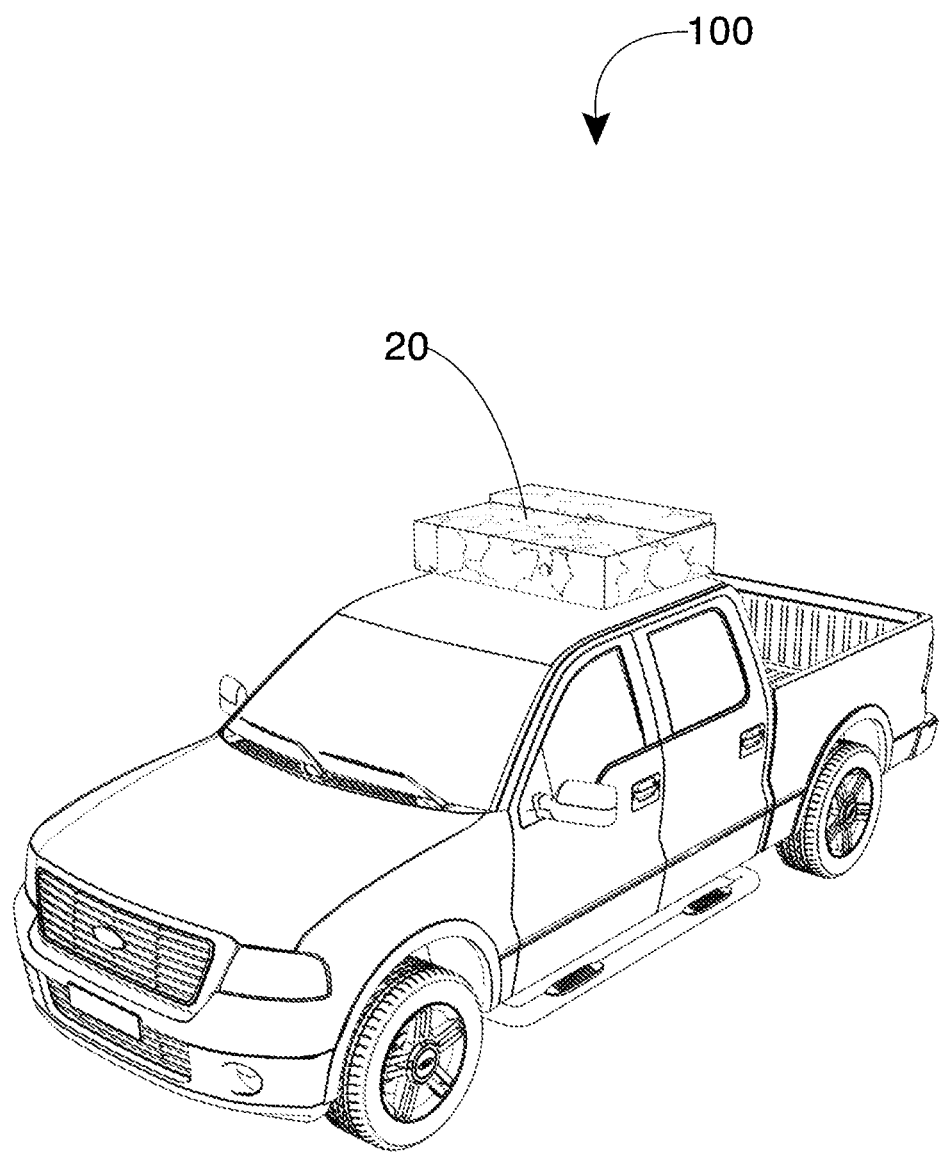
FIG. 5 is a perspective view of the vehicle cab protective top cover system of FIG. 1, according to an embodiment of the present disclosure.

FIG. 5 shows a perspective view of the vehicle cab protective top cover system 100 of FIG. 1, according to an embodiment of the present disclosure. As above, the vehicle cab protective top cover system 100 may include the platform assembly 110 being removably engaged with a cab 10 of a vehicle. The platform assembly 110 engages with a rear-edge of the top portion of the cab 10 of the vehicle. The top-surface 120 of the platform assembly 110 contacts and supports hauled items and the platform assembly 110 provides a buffer between the top portion of the cab 10 of the vehicle and the hauled items. The vehicle cab protective top cover system 100 may further include a removable weatherproof covering.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A vehicle cab protective top cover system comprising:
   a platform assembly comprising a rigid section;
   a top-surface;
   a bottom-surface; and
   a magnet fastener system;
   wherein said platform assembly is defined by said top-surface and said bottom-surface forming a thickness;
   wherein said magnet fastener system is embedded within said platform assembly and configured to removably fasten said platform assembly to a metal surface of a top portion of a cab of a vehicle; and
   wherein said platform assembly forms a barrier and provides a protective top cover for said top portion of said cab of said vehicle.

2. The vehicle cab protective top cover system of claim 1, wherein said platform assembly comprises semi-rigid foam.

3. The vehicle cab protective top cover system of claim 2, wherein said semi-rigid foam comprises expanded polystyrene foam.

4. The vehicle cab protective top cover system of claim 1, wherein said platform assembly comprises a three-dimensional substantially rectangular profile.

5. The vehicle cab protective top cover system of claim 4, wherein said platform assembly covers a substantial portion of said top portion of said cab.

6. The vehicle cab protective top cover system of claim 1, wherein said platform assembly is removably affixable to said cab of said vehicle and said magnet fastener system provides a temporary fastener for use.

7. The vehicle cab protective top cover system of claim 6, wherein said magnet fastener system is proximal to said bottom-surface such that said bottom-surface is able to magnetically engage with said top portion of said cab of said vehicle.

8. The vehicle cab protective top cover system of claim 1, wherein said vehicle is stationary during use of said platform assembly.

9. The vehicle cab protective top cover system of claim 1, wherein said rigid section extends along a top edge of said top-surface.

10. The vehicle cab protective top cover system of claim 9, wherein said ridged section comprises wood.

11. The vehicle cab protective top cover system of claim 9, wherein said ridged section is approximately 3 inches wide and 0.5 inch thick.

12. The vehicle cab protective top cover system of claim 1, wherein said vehicle is non-stationary when coupled to said platform assembly.

13. The vehicle cab protective top cover system of claim 1, wherein said platform assembly engages with a rear-edge of said top portion of said cab of said vehicle.

14. The vehicle cab protective top cover system of claim 1, wherein said magnet fastener system comprises a plurality of magnets.

15. The vehicle cab protective top cover system of claim 1, wherein said top-surface of said platform assembly contacts and supports hauled items and said platform assembly provides a buffer between said top portion of said cab of said vehicle and said hauled items.

16. The vehicle cab protective top cover system of claim 1, wherein said thickness of said platform assembly is between 2 inches and 2.5 inches.

17. A vehicle cab protective top cover system, the vehicle cab protective top cover system comprising:
   a platform assembly;
   a top-surface;
   a bottom-surface; and
   a magnet fastener system;
wherein said platform assembly is defined by said top-surface and said bottom-surface forming a thickness;
wherein said magnet fastener system is embedded within said platform assembly and configured to removably fasten said platform assembly to a metal surface of a top portion of a cab of a vehicle;
wherein said platform assembly forms a barrier and provides a protective top cover for said top portion of said cab of said vehicle;
wherein said platform assembly comprises semi-rigid foam;
wherein said semi-rigid foam comprises expanded polystyrene foam;
wherein said platform assembly comprises a three-dimensional substantially rectangular profile;
wherein said platform assembly covers a substantial portion of said top portion of said cab;
wherein said platform assembly is removably affixable to said cab of said vehicle and said magnet fastener system provides a temporary fastener for use;
wherein said magnet fastener system is proximal to said bottom-surface such that said bottom-surface is able to magnetically engage with said top portion of said cab of said vehicle;
wherein said platform assembly further comprises a rigid section;
wherein said rigid section extends along a top edge of said top-surface;
wherein said ridged section comprises wood;
wherein said ridged section is approximately 3 inches wide and 0.5 inch thick;
wherein said platform assembly engages with a rear-edge of said top portion of said cab of said vehicle;
wherein said magnet fastener system comprises a plurality of magnets;
wherein said top-surface of said platform assembly contacts and supports hauled items and said platform assembly provides a buffer between said top portion of said cab of said vehicle and said hauled items; and
wherein said thickness of said platform assembly is between 2 inches and 2.5 inches.

\* \* \* \* \*